(12) United States Patent
Whalley et al.

(10) Patent No.: US 7,515,105 B2
(45) Date of Patent: Apr. 7, 2009

(54) METHOD FOR MAPPING MACHINE ROOMS AND LOCATING MACHINES WITHIN MACHINE ROOMS

(75) Inventors: Ian Nicholas Whalley, Pawling, NY (US); Steve R. White, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 10/994,394

(22) Filed: Nov. 23, 2004

(65) Prior Publication Data

US 2006/0167624 A1 Jul. 27, 2006

(51) Int. Cl.
*G01S 3/02* (2006.01)
*G01S 3/80* (2006.01)

(52) U.S. Cl. .......................... 342/465; 367/128

(58) Field of Classification Search ................ 342/465; 367/128
See application file for complete search history.

(56) References Cited

U.S. PATENT DOCUMENTS

| | | | | |
|---|---|---|---|---|
| 6,327,219 | B1 * | 12/2001 | Zhang et al. ................ | 367/128 |
| 6,720,922 | B2 * | 4/2004 | Williams et al. ............ | 342/465 |
| 6,734,824 | B2 * | 5/2004 | Herman ....................... | 342/465 |

* cited by examiner

*Primary Examiner*—Thomas H Tarcza
*Assistant Examiner*—Harry Liu
(74) *Attorney, Agent, or Firm*—Whitman, Curtis, Christofferson & Cook, PC; Stephen C. Kaufman

(57) ABSTRACT

A system and method automatically maps computer center rooms and locates data center components within computer centers. Radio triangulation is used to determine the locations and, optionally, orientation, of machines within a computer center.

1 Claim, 9 Drawing Sheets

METHOD FOR MAPPING MACHINE ROOMS AND LOCATING MACHINES WITHIN MACHINE ROOMS

BACKGROUND OF THE INVENTION

1. Field of the Invention

The present invention generally relates to administration and maintenance of large computer centers and, more particularly, to the mapping of computer center rooms and locating data center components within a computer center.

2. Background Description

The modern computer center is a complex place. Computers of different types and purposes abound, many are critical to the correct operation of the infrastructure, and most are vitally important to one or more business functions. A significant problem in such modern computer centers is that of machine location. "Where is machine frobnitz.foobar.com?" is a question that might at first seem strange but, to anyone who has worked inside such a computer center, is entirely understandable. In hosting centers, where thousands of machines sit tightly packed on rack after rack, locating "frobnitx.foobar.com" suddenly becomes daunting—even when all the machines are correctly labeled.

There is really only one traditional solution to this problem—using a map, or a coordinate-based system, indexed by machine name. The map or coordinates are maintained manually; that is to say, when a new computer is added to the computer center, or a computer already within the center is repurposed, the map is updated by a system administrator. For example, "corridor 7, rack 10, computer 8" might represent the location of "frobnitz.foobar.com" in one possible coordinate system. Coupled with clear labeling of the corridors, racks, and computers, this helps administrators find the machine in question.

This system can be extended by using modern network equipment whereby it is possible, from an administrative computer, to determine to which piece(s) of networking hardware (routers, hubs, switches, etc.) the machine "frobnitz.foobar.com" is connected. Provided that the computer center has been laid out in a logical fashion, this information will help the administrator locate the machine, but only in association with a map or coordinate index.

Such coordinate systems tend to break down. They are highly likely to fall out of synchronization with reality, as machines get repurposed and moved around. Such errors immediately doom the system to failure. As soon as the coordinate system or map starts to become incorrect, the people will stop updating it, and it will become more and more inaccurate over a small period of time.

SUMMARY OF THE INVENTION

It is therefore an object of the present invention to provide a system and method for automatically mapping computer center rooms and locating data center components within computer centers which does not require manual mapping or coordinate-based systems that become quickly obsolete.

According to the invention, radio triangulation (a pre-existing and well-understood technique) is used to determine the locations and, optionally, orientation, of machines within a computer center. Triangulation requires transmitters (to broadcast electromagnetic signals) and receivers (to receive those same electromagnetic signals). The receivers are (unless otherwise specified) directional; that is to say, each receiver can determine the direction from their position of each transmitter whose signal the receiver can detect. The signals from the multiple transmitters are distinguishable from one another, such that the receivers can uniquely identify each transmitter, and determine how many different signals it is receiving, and the direction of those signals.

In one preferred embodiment, the computers needed to be mapped or located are referred to, for the purposes of this invention, as data center components. The data center components within the computer center are equipped with one or more transmitters. Receivers are positioned in fixed locations in the computer center, and these positions are known to the central computing resource. The central computing resource is the computing resource located within the computer center and connected through a network to the transmission equipment. The central computing resource has the role of calculating the relative location, and/or orientation of the data center components. In the event that there are multiple transmitters within each data center component, each transmitter has a unique identification (ID) code associated with it, to distinguish it from the other transmitters within the same computer. The data center component provides the transmitter(s) with an ID unique to the data center component. Several easily available IDs will be evident to those skilled in the art, including, but not limited to, the "MAC addresses" of the machine's network interface cards (NICs). The transmitter(s) broadcasts this unique ID, along with the transmitter's own unique ID, in a signal. The fixed receivers in the computer center then receive transmissions from the transmitters in the data center components within the computer center and relay information about detected signals to the central computing resource. This central computing resource correlate the received information, and is able to deduce positional information (by triangulation) for the machines equipped with a transmitter(s). The central computing resource may derive the location of the data center components by calculating the distances of the data center component from the various receivers within the computer center from the information provided to the central computing resource from the receivers via the network. The network that links the central computing resource with the receivers can be an ethernet, token ring or any other network type commonly available in computer centers.

In the event that the data center components within the computer center are equipped with multiple transmitters, the central computing resource is able to determine the computer's physical orientation; that is to say, not only where the computer is located, but which way it is facing. In order for this to be possible, the multiple transmitters within each computer must be in known locations with respect to one another. In other words, the central computing resource must know not only that there are, for example, three transmitters within a computer, but where each one is within the physical confines of the computer. Such orientation information is likely to prove useful, for example, to perform heat transfer and cooling calculations.

In a second preferred embodiment, the data center components contain directional receivers. In the computer center there are transmitters, which are in fixed, and known, locations. These transmitters broadcast a synchronized time signal (i.e., each transmitter in the computer center broadcasts the same time signal), and their position information (i.e., each transmitter individually broadcasts its position). Within each data center component are one or more non-directional receivers. These receivers detect the signals from the transmitters. Each data center component is connected via a transmission network to the central computing resource. This network connection allows the timing signal information to be sent through the network to the central computing resource.

The information sent may include the difference between time signals from the various transmitters, positional information sent by the transmitters, and identification information of each transmitter. This information is used to derive the relative distance from each transmitter. This can be accomplished by examining the differences between the time signals received from each transmitter. Multiple receivers within each computer (as with multiple transmitters in the first embodiment) permit the orientation of the computer to be derived.

In yet a third preferred embodiment, each data center component in the computer center is equipped with a transceiver (i.e., a combined transmitter and receiver). The transceiver is controlled by the data center component, from which it receives information, and to which it provides information. In this embodiment, the data center component provides the transmitter part of the transceiver with an ID unique to the data center component. Again, several easily available IDs will be evident to those skilled in the art, including, but not limited to, the "MAC addresses" of the machines' NICs. The transmitter broadcasts this unique ID in its signal. In addition, the receiver part of the transceiver passes information back to the data center component. In this embodiment, the receiver provides the data center component with the unique IDs, and data representing the direction (as determined by the receiver) from the receiver to the source of the transmission of that unique ID.

Continuing with this third embodiment, all the so equipped data center components relay (via a network) the information received from their respective transceivers to the central computing resource. The central computing resource then functions as it does in the first preferred embodiment. Those skilled in the art will recognized that a number of known points (i.e., computers equipped with transmitters whose positions are known to the central computing resource) are necessary in order to produce useful data. In addition, the more known points available, the better the triangulation will be.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
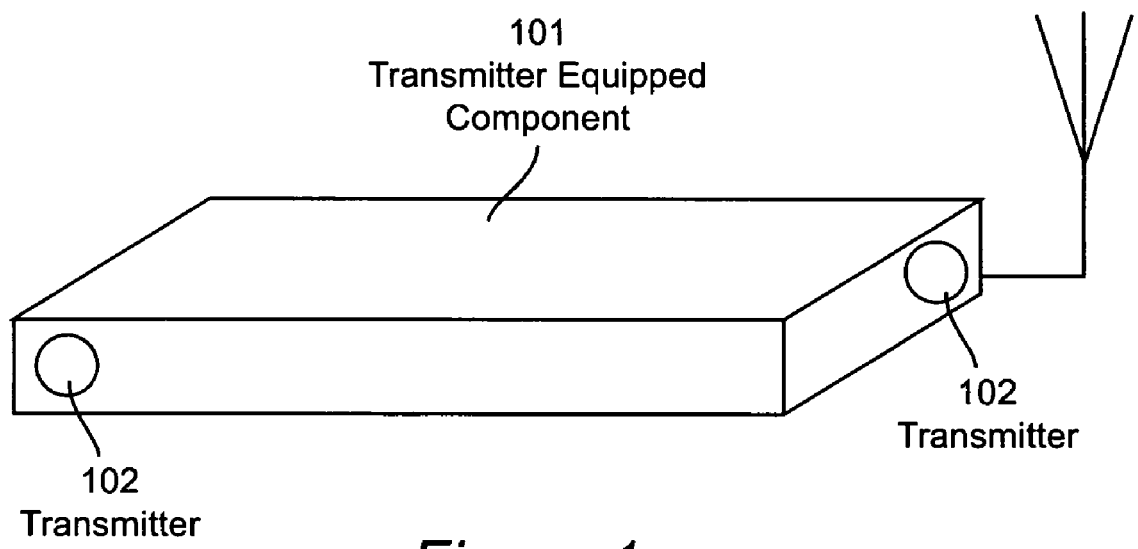
FIG. 1 is an isometric view of a stylized data center component showing an example of the location of transmitters within the data center component case according to a first preferred embodiment of the invention.

Referring now to the drawings, and more particularly to FIG. 1, there is shown a subset of the first preferred embodiment. Specifically, there is shown a transmitter equipped component 101 containing two transmitters 102. These transmitters 102 are at known locations within the component case forming the shell of the component 101. For example, one transmitter is at the front of the case on the top left, and the second transmitter is diagonally opposite, at the back of the case at the bottom right corner. These transmitters are independent elements of the transmitter equipped component 101. Thus, the transmitter equipped component 101 can still be located even when it is not operational.

Figure 2:
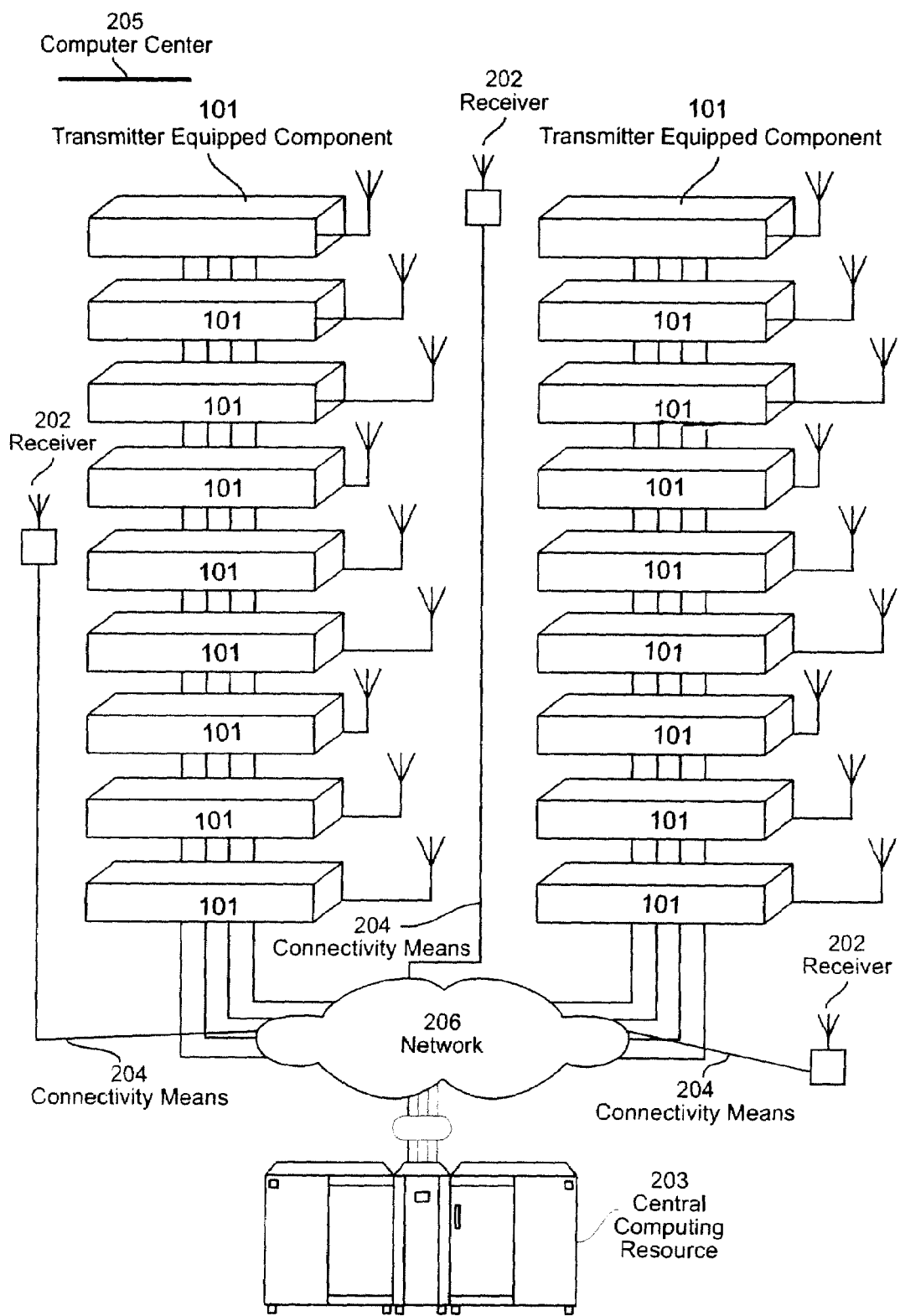
FIG. 2 is a pictorial representation of a computer center housing a plurality of data center components in which multiple receivers are located at known positions and which communicate with the central computing resource.

Turning now to FIG. 2, there is shown a simple computer center 205 containing a number of transmitter equipped components 101. Each of these transmitter equipped components 101 is identical to the combination of transmitter equipped components 101 and the two transmitters 102 shown in FIG. 1. This is an idealized situation, for the purposes of clearly explaining the current invention. Those skilled in the art will recognize that the invention covers the situation where the transmitter equipped components 101 are not all identical and do not contain the transmitters 102 in the same locations.

Also shown in FIG. 2 are the directional receivers 202. In the example illustrated, there are three receivers 202, positioned as shown in the computer center 205. The receivers 202 are configured to receive the signals from the transmitters 102 contained within the transmitter equipped components 101. The information from these directional receivers 202 (specifically, information containing at least the identity of each transmitter whose signal is received by that receiver and the bearing along which that signal was received) is transmitter to the central computing resource 203 by a standard connectivity means 204. These connectivity means 204 can connect the receivers 202 directly or by way of a network 206. The network 206 is shown as an example and is not intenced to suggest that a dedicated network is required for interconnecting the receivers 202 and transmitter equipped components 101. These elements can be interconnected through established networks and/or connectivity paths within the computer center 205. Those skilled in the art will recognize that the invention covers various network configurations and is not limited to the dedicated single network which is shown in FIG. 2 as an illustration.

Figure 3:
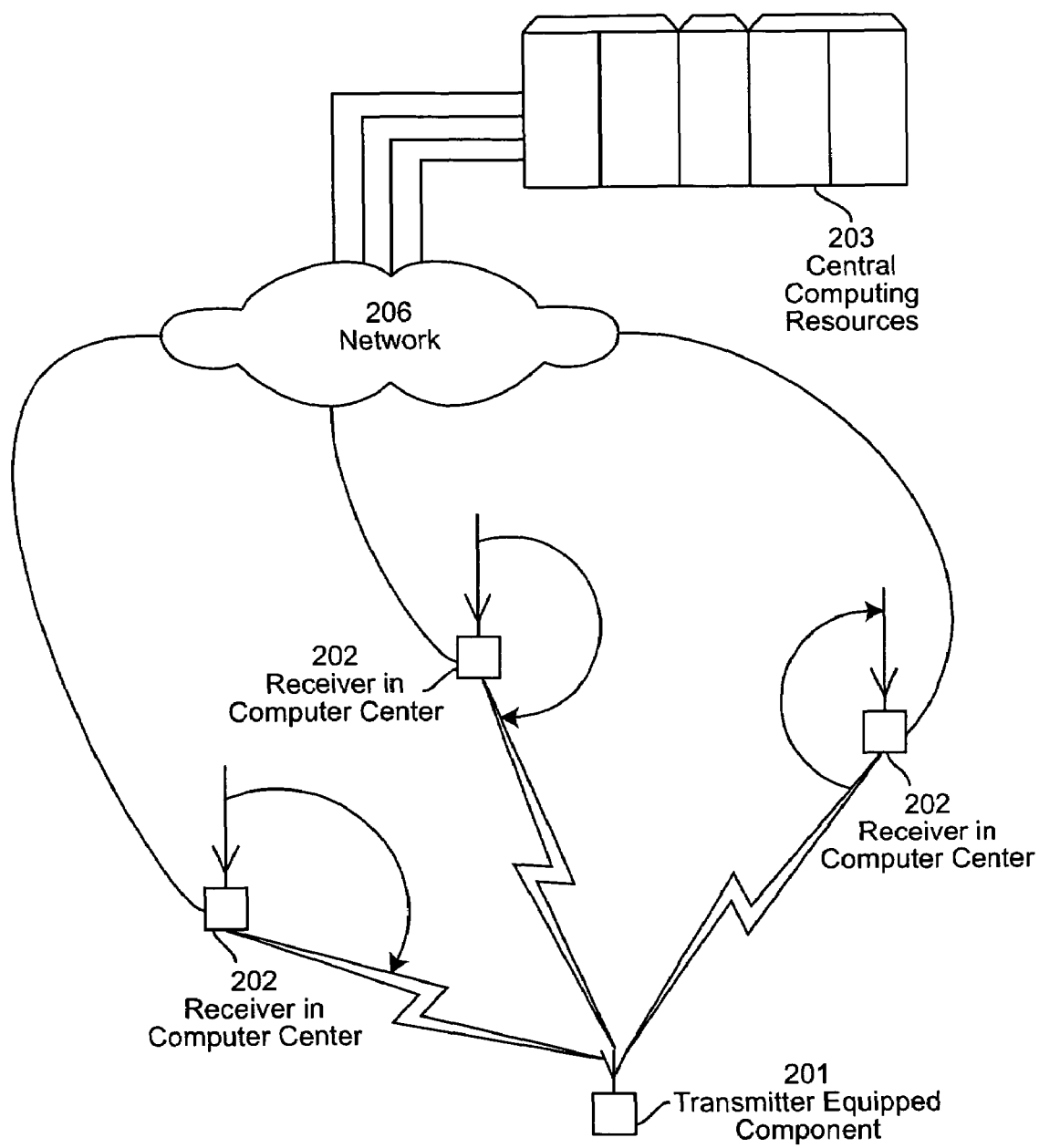
FIG. 3 is a diagram illustrating the process of locating a transmitter by triangulation.

Turning now to FIG. 3, there is shown an example of triangulation using one transmitter 102 located within a transmitter equipped component 201 and three receivers 202. This example is presented in two dimensions for clarity, but it will be obvious to those skilled in the art that the same technique is used in three dimensions. In the example shown, each receiver 202 determines the bearing of the transmission from transmitter equipped computer server 201 as received by the receiver 202. This information is forwarded to the central computing resource 203 through the network. When the central computing resource 203 receives this information, it will be able to derive the location of the transmitter 102 based on knowledge of the location of the receivers 202.

The transmission of the timing signal and the derivation of the locations and/or orientation of the transmitter equipped component 201 can be performed continuously or can be performed on an as needed basis such as when the position and/or orientation of a transmitter equipped component 201 is required.

Figure 4:
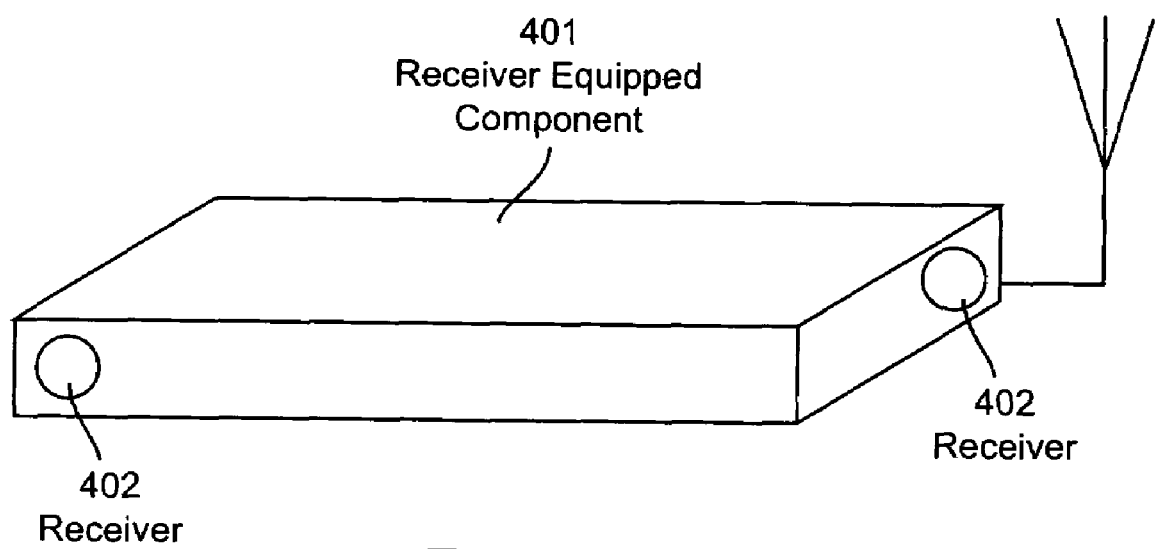
FIG. 4 is an isometric view of a stylized data center component showing an example of the location of receivers within the data center component case according to a second preferred embodiment of the invention.
Figure 5:
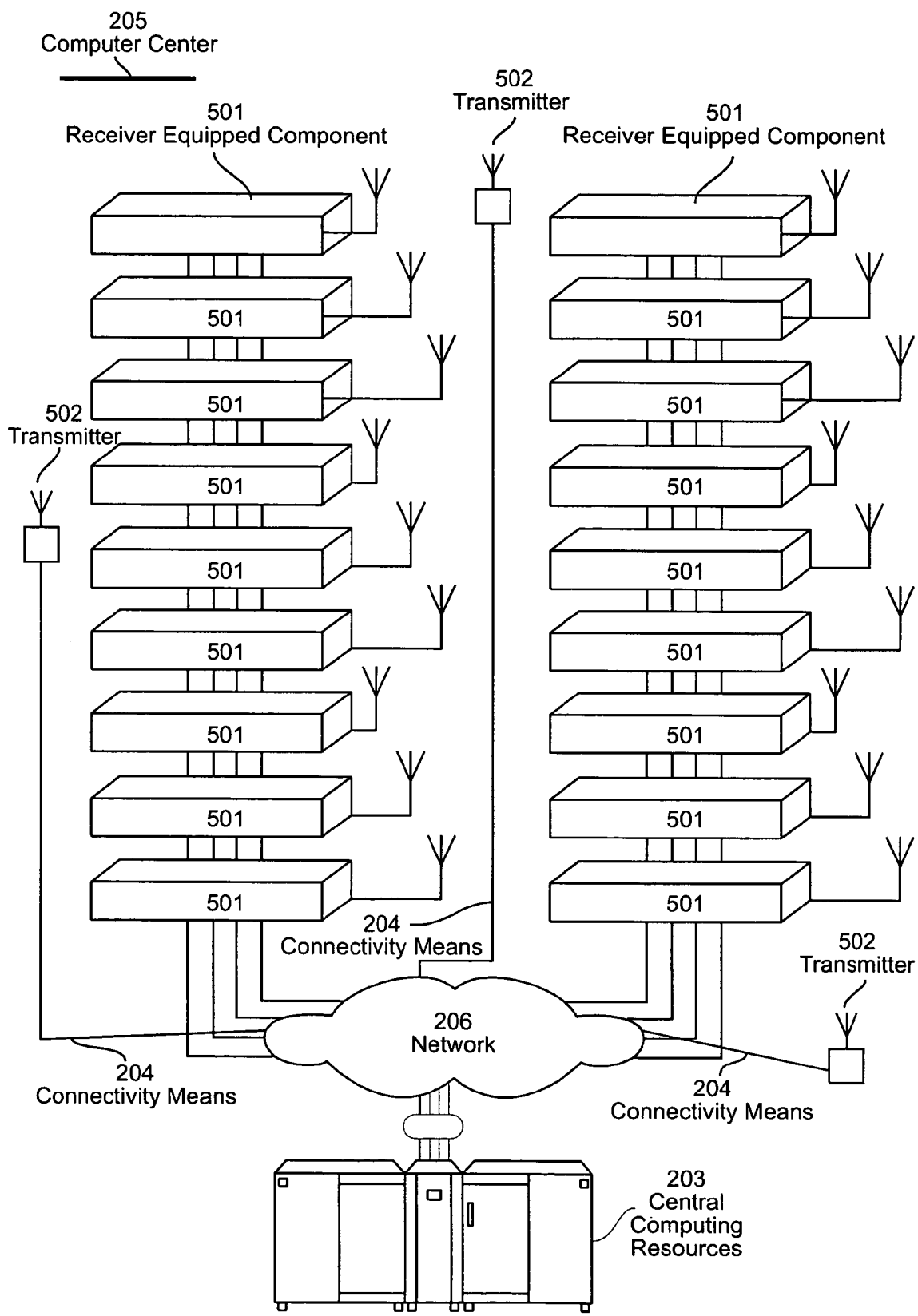
FIG. 5 is a pictorial representation of a machine room housing a plurality of data center components in which multiple transmitters are located at known positions and which communicate with the central computing resource.
Figure 6:
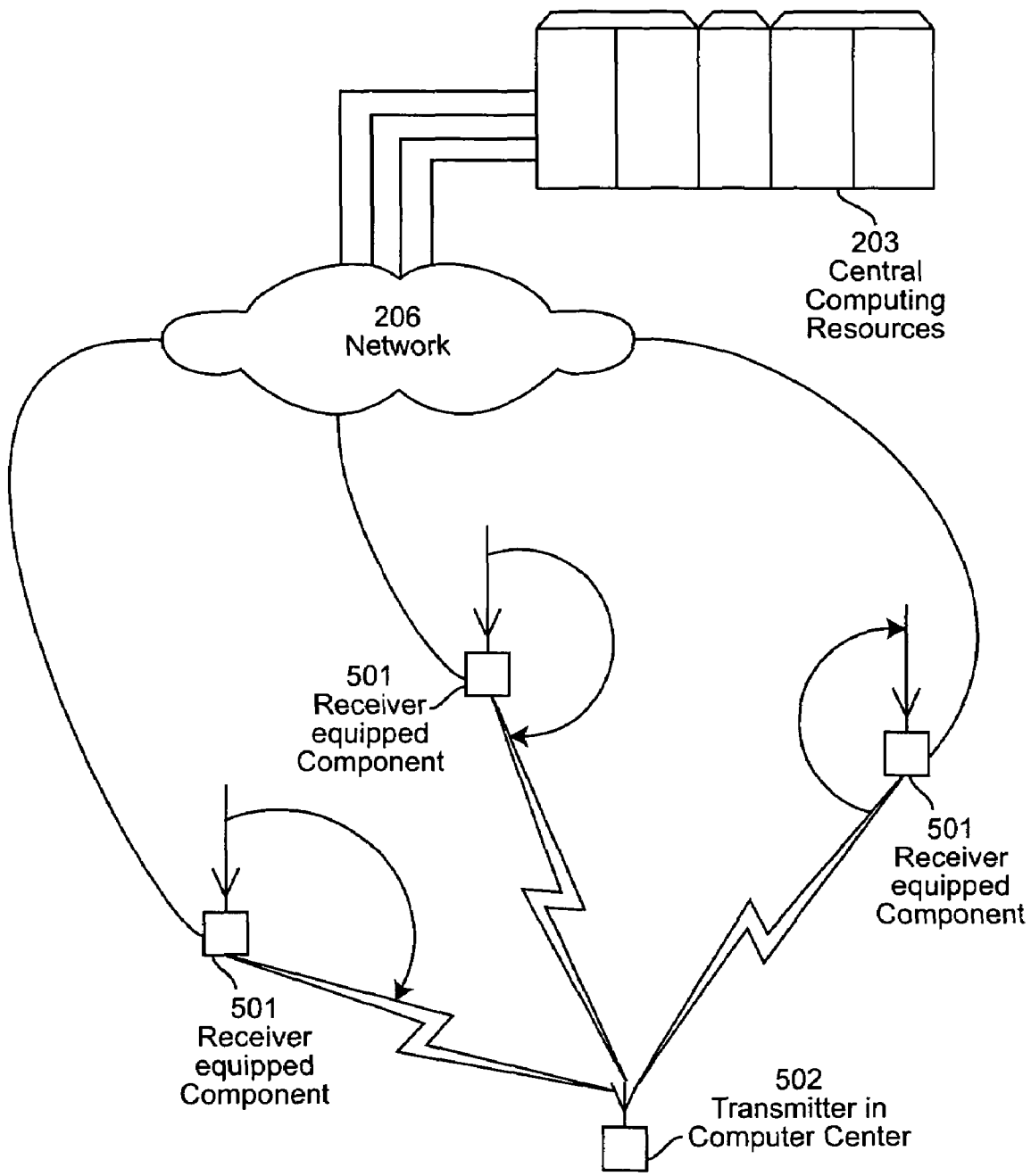
FIG. 6 is a diagram illustrating the process of locating a transmitter by triangulation.

FIGS. 4-6 illustrate the second embodiment of the invention. That is, as shown in FIG. 4, the case where one or more receivers 402 are located in the receiver equipped component 401. FIG. 5 shown a simple computer center 205 containing a number of receiver equipped components 201. Each of these receiver equipped components 201 is identical to the combination of receiver equipped computer server 401 and the two receivers 402 shown in FIG. 4. This is an idealized situation, for the purposes of clearly explaining the current invention. Those skilled in the art will recognize that the invention covers the situation where the receiver equipped components 401 are not all identical and do not contain the receivers 402 in the same locations.

Also shown in FIG. 5 are the transmitters 502. In the example illustrated, there are three transmitters 502, positioned as shown in the computer center 205. The transmitters 502 are configured to transmit the signals to the receiver equipped components 501. The information from these directional receivers 402, shown in FIG. 4 (specifically, information containing at least the identity of each transmitter whose signal is received by that receiver and the bearing along which that signal was received) is routed to the central computing resource 203 by way of a network 206. The network 206 is shown as an example and is not intended to suggest that a dedicated network is required for interconnecting the receiver equipped components 501 and the central computing resource 203. These elements can be interconnected through established networks and/or connectivity paths within the computer center 205. Those skilled in the art will recognize the invention covers various network configurations and is not limited to the dedicated single network which is shown in FIG. 5 as an illustration.

Turning now to FIG. 6, there is shown an example of triangulation using one transmitter 502 located in the computer center 205 and three receivers 402 (as shown in FIG. 4) located within the receiver equipped components 501. This example is presented in two dimensions for clarity, but it will be obvious to those skilled in the art that the same technique is used in three dimensions. In the example shown, each receiver 402 located within the receiver equipped components 501 determines the bearing of the transmission from the transmitter 502 as received by the receiver equipped component 501. This information is forwarded to the central computing resource 203 through the network 206. When the central computing resource 203 receives this information, it will be able to derive the location of the transmitter 102 based on knowledge of the location of the receivers 202.

As in the first embodiment, the transmission of the timing signal and the derivation of the locations and/or orientation of the receiver equipped component 501 can be performed continuously or can be performed on an as needed basis such as when the position and/or orientation of a receiver equipped component 501 is required.

Figure 7:
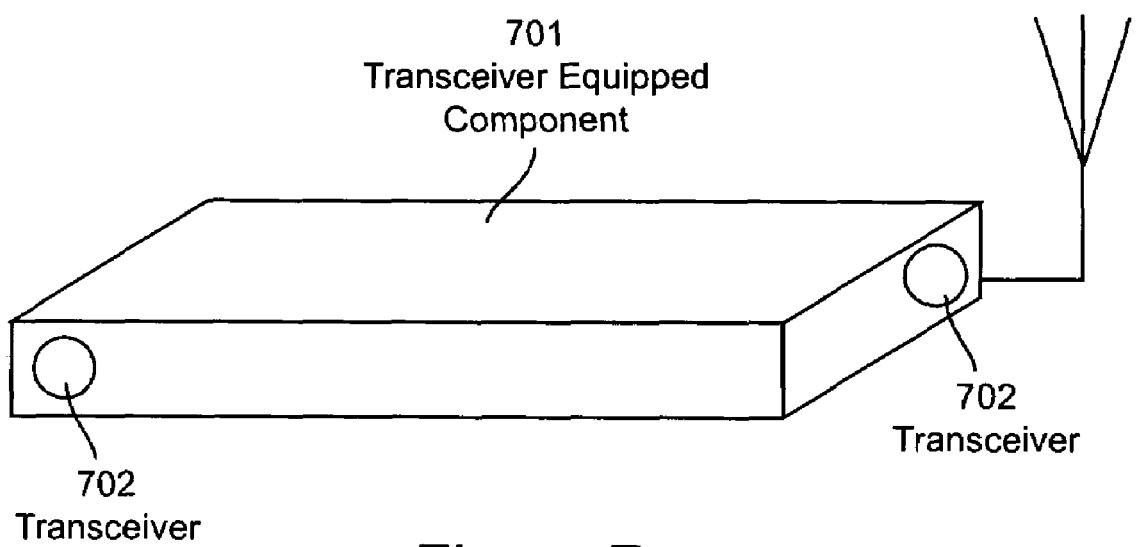
FIG. 7 is an isometric view of a stylized data center component showing an example of the location of transceivers within the computer case according to a third preferred embodiment of the invention.
Figure 8:
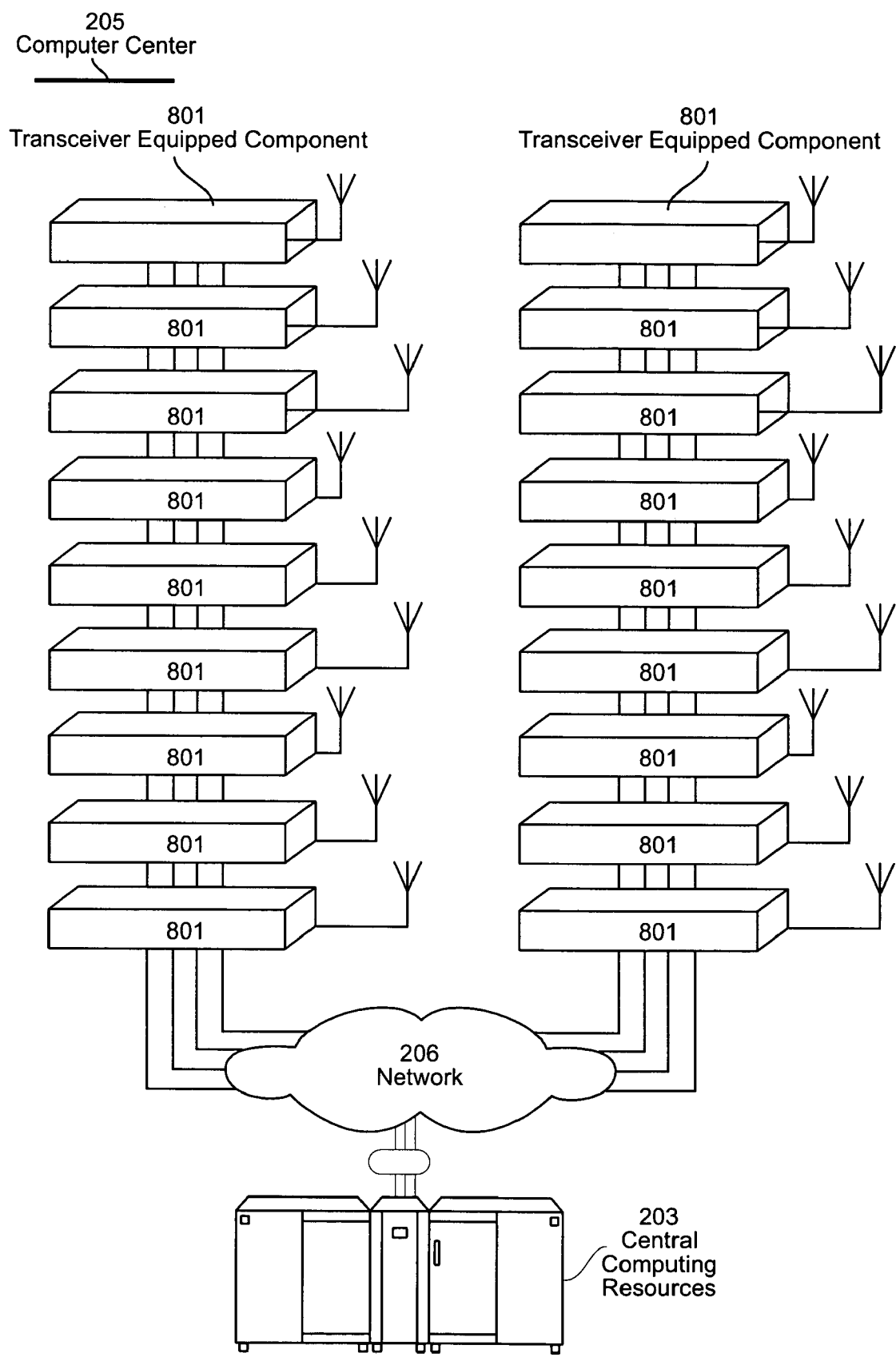
FIG. 8 is a pictorial representation of a machine room housing a plurality of data center components in which multiple transceivers are located at known positions and which communicate with the central computing resource.
Figure 9:
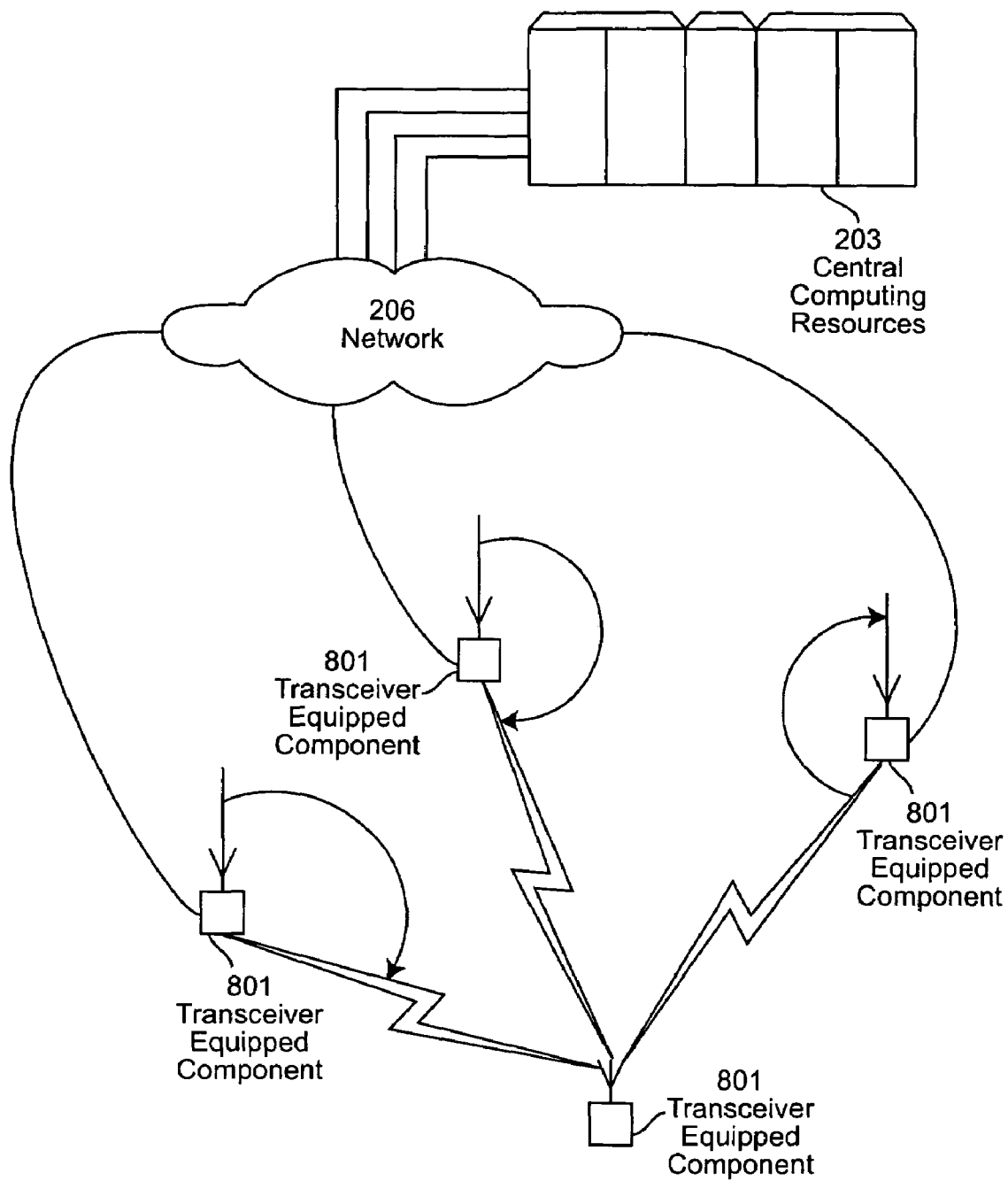
FIG. 9 is a diagram illustrating the process of locating a transceiver by triangulation.

FIGS. 7-9 illustrate the third embodiment of the invention. That is, as shown in FIG. 7, the case where one or more transceivers 702 are located in the transceiver equipped component 701. FIG. 8 shows a simple computer center 205 containing a number of transceiver equipped components 801. Each of these transceiver equipped components 801 is identical to the combination of transceiver equipped components 801 and the two transceivers 802 shown in FIG. 7. This is an idealized situation, for the purposes of clearly explaining the current invention. Those skilled in the art will recognize that the invention covers the situation where the transceiver equipped components 801 are not all identical and do not contain the transceivers 802 in the same locations.

Also shown in FIG. 8 are the transmitters 502. Unlike the previous embodiments, there are no individual receivers or transmitters shown in the computer center 205. Although, anyone skilled in the art would recognize that the invention does not preclude the use of individual receivers and/or transmitters to be located within the computer center 205. The transmitters of the transceivers 702 within the transceiver equipped components 801 are configured to transmit the signals to the receivers of the transceiver within the transceiver equipped components 801. The information from these directional receivers within the transceivers 702, shown in FIG. 7 (specifically, information containing at least the identity of each transmitter whose signal is received by that receiver and the bearing along which that signal was received) is routed to the central computing resource 203 by way of a network 206. The network 206 is shown as an example and is not intended to suggest that a dedicated network is required for interconnecting the transceiver equipped components 801 and the central computing resource 203. These elements can be interconnected through established networks and/or connectivity paths within the computer center 205. Those skilled in the art will recognize the invention covers various network configurations and is not limited to the dedicated single network which is shown in FIG. 5 as an illustration.

Turning now to FIG. 9, there is shown an example of triangulation using one transmitting transceiver equipped component and three receiving transceiver equipped components 801 all of which are located in the computer center 205 (as shown in FIG. 7). This example is presented in two dimensions for clarity, but it will be obvious to those skilled in the art that the same technique is used in three dimensions. In the example shown, each receiver within the transceiver equipped components 801 determines the bearing of the transmission from the transmitting transceiver equipped component 801. This information is forwarded to the central computing resource 203 through the network 206. When the central computing resource 203 receives this information, it will be able to derive the location of the transmitting transceiver equipped components 801 based on a known location of at least one of the transceiver equipped computer. Location can be transmitted as part of the transceiver and/or computer ID. Alternatively, the known location of at least one of the transceiver equipped computer can be known by the central computing resource.

As in the other embodiments, the transmission of the timing signal and the derivation of the locations and/or orientation of the transceiver equipped components 801 can be performed continuously or can be performed on an as needed basis such as when the position and/or orientation of a transceiver equipped component 801 is required.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method of automatically mapping a computer center room comprising a plurality of data center components which are computers, comprising:
   A) equipping the data center components with transmitters including equipping each respective data center component with at least two transmitters, each of the at least two transmitters within the data center component having a unique identification (ID) code distinguishing each transmitter within the same data center component from other transmitters within the same data center component, and further provided that the at least two transmitters within each data center component are in known locations with respect to one another;
   B) positioning receivers in fixed locations in the computer center room, at positions known to a central computing resource, the central computing resource being located within the computer center and connected through a network to the at least two transmitters;
   C) receiving by the receivers of transmissions from the at least two transmitters and relaying information about detected signals to the central computing resource;
   D) receiving, by the central computing resource, the relayed information about detected signals; and
   E) correlating, performed by the central computing resource, the received information about detected signals, including (1) applying radio-triangulation to map location of the data center components and (2) applying radio-triangulation to map orientation of the data center component.

* * * * *